(12) United States Patent
Debevec

(10) Patent No.: US 6,628,298 B1
(45) Date of Patent: Sep. 30, 2003

(54) APPARATUS AND METHOD FOR RENDERING SYNTHETIC OBJECTS INTO REAL SCENES USING MEASUREMENTS OF SCENE ILLUMINATION

(75) Inventor: Paul E. Debevec, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/356,247

(22) Filed: Jul. 16, 1999

Related U.S. Application Data

(60) Provisional application No. 60/093,257, filed on Jul. 17, 1998.

(51) Int. Cl.$^7$ .......................... G06T 15/00; G06T 17/00
(52) U.S. Cl. ..................................................... 345/632
(58) Field of Search ........................ 345/433, 435, 345/426, 632, 633

(56) References Cited

U.S. PATENT DOCUMENTS 6,166,744 A * 12/2000 Jaszlics et al.

OTHER PUBLICATIONS

Sillion et al., "Radiosity Global Illumination", Morgan Kaufmann Publishers, Aug. 1994, pp. 1–21.

Gene S. Miller and C. Robert Hoffman, Illumination and Reflection Maps: Simulated Objects in Simulated and Real Environments, Jul. 23, 1984, SIGGRAPH 84, pp. 1–12.*

* cited by examiner

*Primary Examiner*—Jeffery Brier
(74) *Attorney, Agent, or Firm*—Pennie & Edmonds LLP

(57) ABSTRACT

A method of placing an image of a synthetic object into a scene includes the step of establishing a recorded field of illumination that characterizes variable incident illumination in a scene. A desired position and orientation of a synthetic object is specified within the scene with respect to the recorded field of illumination. A varying field of illumination caused by the synthetic object is identified within the scene. Synthetic object reflectance caused by the synthetic object is simulated in the scene. The synthetic object is then constructed within the scene using the varying field of illumination and the synthetic object reflectance.

7 Claims, 3 Drawing Sheets

APPARATUS AND METHOD FOR RENDERING SYNTHETIC OBJECTS INTO REAL SCENES USING MEASUREMENTS OF SCENE ILLUMINATION

This invention claims priority to the provisional patent application entitled "Apparatus and Method for Rendering Synthetic Objects into Real Scenes", Ser. No. 60/093,257, filed Jul. 17, 1998.

This invention was made with Government support under Grant No. FDN00014-96-1-1200 awarded by the Office of Naval Research (ONR BMDO). The Government has certain rights to this invention.

BRIEF DESCRIPTION OF THE INVENTION

This invention relates generally to computer graphics. More particularly, this invention relates to techniques for rendering synthetic objects into real scenes in a computer graphics context.

BACKGROUND OF THE INVENTION

The practice of adding new objects to photographs dates to the early days of photography in the simple form of pasting a cut-out from one picture onto another. While the technique conveys the idea of the new object being in the scene, it usually fails to produce an image that as a whole is a believable photograph. Attaining such realism requires a number of aspects of the two images to match. First, the camera projections should be consistent, otherwise the object may seem too foreshortened or skewed relative to the rest of the picture. Second, the patterns of film grain and film response should match. Third, the lighting on the object needs to be consistent with other objects in the environment. Lastly, the object needs to cast realistic shadows and reflections on the scene. Skilled artists found that by giving these considerations due attention, synthetic objects could be painted into still photographs convincingly.

In optical film compositing, the use of object mattes to prevent particular sections of film from being exposed made the same sort of cut-and-paste compositing possible for moving images. However, the increased demands of realism imposed by the dynamic nature of film made matching camera positions and lighting even more critical. As a result, care was taken to light the objects appropriately for the scene into which they were to be composited. This would still not account for the objects casting shadows onto the scene, so often these were painted in by artists frame by frame. Digital film scanning and compositing helped make this process far more efficient.

Global illumination work has recently produced algorithms and software to realistically simulate lighting in synthetic scenes, including indirect lighting with both specular and diffuse reflections. Some work has been done on the specific problem of compositing objects into photography. For example, there are known procedures for rendering architecture into background photographs using knowledge of the sun position and measurements or approximations of the local ambient light. For diffuse buildings in diffuse scenes, the technique can be effective. The technique of reflection mapping (also called environment mapping) produces realistic results for mirror-like objects. In reflection mapping, a panoramic image is rendered or photographed from the location of the object. Then, the surface normals of the object are used to index into the panoramic image by reflecting rays from the desired viewpoint. As a result, the shiny object appears to properly reflect the desired environment. (Using the surface normal indexing method, the object will not reflect itself. Correct self-reflection can be obtained through ray tracing). However, the technique is limited to mirror-like reflection and does not account for objects casting light or shadows on the environment.

A common visual effects technique for having synthetic objects cast shadows on an existing environment is to create an approximate geometric model of the environment local to the object, and then compute the shadows from various manually specified light sources. The shadows can then be subtracted from the background image. In the hands of professional artists this technique can produce excellent results, but it requires knowing the position, size, shape, color, and intensity of each of the scene's light sources. Furthermore, it does not account for diffuse reflection from the scene, and light reflected by the objects onto the scene must be handled specially.

Thus, there are a number of difficulties associated with rendering synthetic objects into real-world scenes. It is becoming particularly important to resolve these difficulties in the field of computer graphics, particularly in architectural and visual effects domains. Oftentimes, a piece of furniture, a prop, or a digital creature or actor needs to be rendered seamlessly into a real scene. This difficult task requires that the objects be lit consistently with the surfaces in their vicinity, and that the interplay of light between the objects and their surroundings be properly simulated. Specifically, the objects should cast shadows, appear in reflections, and refract, focus, and emit light just as real objects would.

Currently available techniques for realistically rendering synthetic objects into scenes are labor intensive and not always successful. A common technique is to manually survey the positions of the light sources, and to instantiate a virtual light of equal color and intensity for each real light to illuminate the synthetic objects. Another technique is to photograph a reference object (such as a gray sphere or a real model similar in appearance to the chosen synthetic object) in the scene where the new object is to be rendered, and use its appearance as a qualitative guide in manually configuring the lighting environment. Lastly, the technique of reflection mapping is useful for mirror-like reflections. These methods typically require considerable hand-refinement and none of them properly simulates the effects of indirect illumination from the environment.

Accurately simulating the effects of both direct and indirect lighting has been the subject of research in global illumination. With a global illumination algorithm, if the entire scene were modeled with its full geometric and reflectance (BRDF) characteristics, one could correctly render a synthetic object into the scene simply by adding to the model and re-computing the global illumination solution. Unfortunately, obtaining a full geometric and reflectance model of a large environment is extremely difficult. Furthermore, global illumination solutions for large complex environments are extremely computationally intensive.

Moreover, it seems that having a full reflectance model of the large-scale scene should be unnecessary: under most circumstances a new object will have no significant effect on the appearance of most of the distant scene. Thus, for such distant areas, knowing just its radiance (under the desired lighting conditions) should suffice.

The patent application entitled "Apparatus and Method for Recovering High Dynamic Range Radiance Maps from Photographs", Ser. No. 09/126,631, filed Jul. 30, 1998, (hereinafter referred to as "the Debevec patent") introduces a high dynamic range photographic technique that allows accurate measurements of scene radiance to be derived from a set of differently exposed photographs. The patent application is assigned to the assignee of the present invention and is incorporated by reference herein. The technique described in the patent application allows both low levels of indirect radiance from surfaces and high levels of direct radiance from light sources to be accurately recorded. When combined with image-based modeling and rendering techniques such as view interpolation, projective texture mapping, and possibly active techniques for measuring geometry, these derived radiance maps can be used to construct spatial representations of scene radiance.

The term light-based model refers to a representation of a scene that consists of radiance information, possibly with specific reference to light leaving surfaces, but not necessarily containing reflectance property (BRDF) information. A light-based model can be used to evaluate the 5D plenoptic function $P(\theta, \phi, V_x, V_y, V_z)$ for a given virtual or real subset of space, as described in Adelson, et al., "Computational Models of Visual Processing", MIT Press, Cambridge, Mass., 1991, Ch. 1. A material-based model is converted to a light based model by computing an illumination solution for it. A light-based model is differentiated from an image-based model in that its light values are actual measures of radiance, whereas image-based models may contain pixel values already transformed and truncated by the response function of an image acquisition or synthesis process.

It would be highly desirable to provide a technique for realistically adding new objects to background plate photography as well as general light-based models. The synthetic objects should be able to have arbitrary material properties and should be able to be rendered with appropriate illumination in arbitrary lighting environments. Furthermore, the objects should correctly interact with the environment around them; that is, they should cast the appropriate shadows, they should be properly reflected, they should reflect and focus light, and they should exhibit appropriate diffuse inter-reflection. Ideally, the method should be carried out with commonly available equipment and software.

SUMMARY OF THE INVENTION

A method of placing an image of a synthetic object into a scene includes the step of establishing a recorded field of illumination that characterizes variable incident illumination in a scene. A desired position and orientation of a synthetic object is specified within the scene with respect to the recorded field of illumination. A varying field of illumination caused by the synthetic object is identified within the scene. Synthetic object reflectance caused by the synthetic object is simulated in the scene. The synthetic object is then constructed within the scene using the varying field of illumination and the synthetic object reflectance.

The technique of the invention allows for one or more computer generated objects to be illuminated by measurements of illumination in a real scene and combined with existing photographs to compute a realistic image of how the objects would appear if they actually had been photographed in the scene, including shadows and reflections on the scene.. A photographic device called a light probe is used to measure the full dynamic range of the incident illumination in the scene. An illumination technique (for example, a global illumination technique) is used to illuminate the synthetic objects with these measurements of real light in the scene. To generate the image of the objects placed into the scene, the invention partitions the scene into three components. The first is the distant scene, which is the visible part of the environment too remote to be perceptibly affected by the synthetic object. The second is the local scene, which is the part of the environment that will be significantly affected by the presence of the objects. The third component is the synthetic objects. The illumination algorithm is used to correctly simulate the interaction of light amongst these three elements, with the exception that light radiated toward the distant environment will not be considered in the calculation. As a result, the reflectance characteristics of the distant environment need not be known—the technique uses reflectance characteristics only for the local scene and the synthetic objects. The challenges in estimating the reflectance characteristics of the local scene are addressed through techniques that result in usable approximations. A differential rendering technique produces perceptually accurate results even when the estimated reflectance characteristics are only approximate. The invention also allows real objects and actors to be rendered into images and environments in a similar manner by projecting the measured illumination onto them with computer-controlled light.

BRIEF DESCRIPTION OF THE DRAWINGS

For a better understanding of the invention, reference should be made to the following detailed description taken in conjunction with the accompanying drawings, in which.

Like reference numeral refer to corresponding parts throughout the drawings.

DETAILED DESCRIPTION OF THE INVENTION

Figure 1:
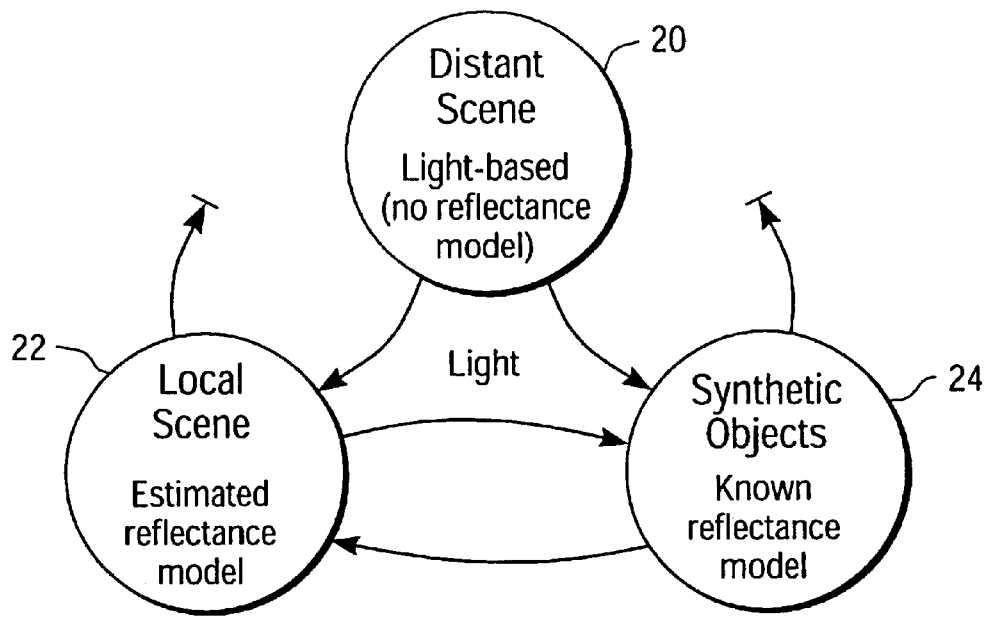
FIG. 1 illustrates the processing steps associated with an embodiment of the invention.

FIG. 1 illustrates the processing steps associated with an embodiment of the invention. As shown in the figure, a scene is partitioned into three components. The first is the distant scene 20, which is the visible part of the environment too remote to be perceptibly affected by the synthetic object. The second is the local scene 22, which is the part of the environment which will be significantly affected by the presence of the objects. The third component is the synthetic object or objects 24.

Global illumination is used to correctly simulate the interaction of light amongst these three elements, with the exception that light radiated toward the distant environment will not be considered in the calculation. As a result, the BRDF of the distant environment need not be known—the technique uses BRDF information only for the local scene and the synthetic objects.

The method of the invention is disclosed in connection with the specific case of rendering synthetic objects into particular views of a scene (such as background plates) rather than into a general image-based model. In this method, a light probe is used to acquire a high dynamic range panoramic radiance map near the location where the object will be rendered. A simple example of a light probe is a camera aimed at a mirrored sphere, a configuration commonly used for acquiring environment maps. An approximately geometric model of the scene is created (via surveying, photogrammetry, or 3D scanning with lasers or structured light) and mapped with radiance values measured with the light probe. The distant scene, local scene, and synthetic objects are rendered with global illumination from the same point of view as the background plate, and the results are composited into the background plate with a differential rendering technique.

The invention is disclosed by addressing the following topics. Attention initially turns to the basic technique of using acquired maps of scene radiance to illuminate synthetic objects. Next, the general method of rendering synthetic objects into real scenes is described. Afterwards, a practical technique based on this method using a light probe to measure incident illumination is described. Subsequently, a discussion ensues regarding a differential rendering technique for rendering the local environment with only an approximate description of its reflectance. A simple method to approximately recover the diffuse reflectance characteristics of the local environment is then discussed.

Ideally, computer-generated objects are lit by actual recordings of light from the scene, using global illumination or a related computer graphics illumination technique, such as radiosity or ray-tracing. Performing the lighting in this manner provides a unified and physically accurate alternative to manually attempting to replicate incident illumination conditions.

Accurately recording light in a scene is difficult because of the high dynamic range that scenes typically exhibit; this wide range of brightness is the result of light sources being relatively concentrated. As a result, the intensity of a source is often two to six orders of magnitude (i.e., from one hundred to one million times) larger than the intensity of the non-emissive parts of an environment. However, it is necessary to accurately record both the large areas of indirect light from the environment and the concentrated areas of direct light from the sources since both are significant parts of the illumination solution.

Using the technique of the previously cited Debevec patent, one can acquire correct measures of scene radiance using conventional imaging equipment. The images, called radiance maps, are derived from a series of images with different sensor integration times and a technique for computing and accounting for the imaging system response function $f$. These measures are used to illuminate synthetic objects exhibiting arbitrary material properties. New digital photographic methods are also able to achieve high dynamic range via logarithmic (or similarly nonlinear) response image sensor elements.

A high-dynamic range lighting environment with, for example, electric, natural, and indirect lighting can be obtained by taking a full dynamic range photograph of a mirrored ball on a table. Alternate techniques to acquire an omni-direction view of the scene involve using fisheye lenses, or by using a mosaic of photographs looking in different directions, by scanning the scene with a linear image sensor, or by photographing a curved mirror of non-spherical shape. In other words, an omni-directional high dynamic range illuminated scene may be acquired by a series of images with varying exposure amounts, by a series of images from electronic imaging devices aimed in different directions, from a series of images from digital cameras aimed in different directions, a wide angle refractive lens system, or from a reflective curved object covering a wide field of view.

A digital camera can be used to acquire a series of images in, for example, two-stop exposure increments from ¼ to ¹⁄₁₀₀₀ second. The images may then be fused using the technique described in the previously cited Debevec patent application. A single low-dynamic range photograph would be unable to record the correct colors and intensities over the entire scene. However, using the technique of the Debevec patent, recovered RGB radiance values for all the points in the scene including the light sources can be achieved.

Attention now turns to extending the technique of using radiance maps to illuminate synthetic objects to a technique of computing the proper photometric interaction of the objects with the scene. How high dynamic range photography and image-based modeling combine in a natural manner to allow the simulation of arbitrary (non-infinite) lighting environments is also discussed.

Adding new objects to light-based scene representations also involves partitioning a scene into three parts: the distant scene, the local scene, and the synthetic objects. The geometric and photometric requirements for each of these components can be described as follows.

A light-based model is used for the distant scene. The distant scene is constructed as a light-based model. The synthetic objects will receive light from this model, so it is necessary that the model store true measures of radiance rather than low dynamic range pixel values from conventional images. The light-based model can take on any form, using very little explicit geometry, some geometry, moderate geometry, or be a full 3D scan of an environment with view-dependent texture-mapped radiance. What is important is for the model to provide accurate measures of incident illumination in the vicinity of the objects, as well as from the desired viewpoint. The discussion below presents a convenient procedure for constructing a minimal model that meets these requirements.

In the illumination computation, the distant scene radiates light toward the local scene and the synthetic objects, but ignores light reflected back to it. It is assumed that no area of the distant scene will be significantly affected by light reflecting from the synthetic objects; if that were the case, the area should instead belong to the local scene, which contains the BRDF information necessary to interact with light.

An approximate material-based model of the local scene is then established. The local scene consists of the surfaces that will photometrically interact with the synthetic objects in a visually significant manner. It is this geometry onto which the objects will cast shadows and reflect light. Since the local scene needs to fully participate in the illumination solution, both its geometry and reflectance characteristics should be known, at least approximately. If the geometry of the local scene is not readily available with sufficient accuracy from the light-based model of the distant scene, there are various techniques available for determining its geometry through active or passive methods. In the common case where the local scene is a flat surface that supports the synthetic objects, its geometry is determined easily from the camera pose.

Usually, the local scene will be the part of the scene that is geometrically close to the synthetic objects. When the local scene is mostly diffuse, the rendering equation shows that the visible effect of the objects on the local scene decreases as the inverse square of the distance between the two. Nonetheless, there are a variety of circumstances in which synthetic objects can significantly affect areas of the scene not in the immediate vicinity. Some common circumstances are:

If there are concentrated light sources illuminating the object, then the object can cast a significant shadow on a distant surface collinear with it and the light source. If there are concentrated light sources and the object is flat and specular, it can focus a significant amount of light onto a distant part of the scene. If a part of the distant scene is flat and specular (e.g. a mirror on a wall), its appearance can be significantly affected by a synthetic object.

If the synthetic object emits light (e.g. a synthetic laser), it can affect the appearance of the distant scene significantly.

These situations should be considered in choosing which parts of the scene should be deemed local and which parts distant. Any part of the scene that will be significantly affected in its appearance from the desired viewpoint should be included as part of the local scene.

Since the local scene is a full BRDF model (that is, it is imbued with surface reflectance characteristics), it can be added to the illumination computation as would any other object. The local scene may consist of any number of surfaces and objects with different material properties. For example, the local scene could consist of a patch of floor beneath the synthetic object to catch shadows as well as a mirror surface hanging on the opposite wall to catch a reflection. The local scene replaces the corresponding part of the light-based model of the distant scene.

Since it can be difficult to determine the precise BRDF characteristics of the local scene, it is often desirable to have only the change in the local scene's appearance be computed with the BRDF estimate; its appearance due to illumination from the distant scene is taken from the original light-based model. This differential rendering method is presented below.

Complete material-based models of the objects must also be considered. The synthetic objects themselves may consist of any variety of shapes and materials supported by the global illumination software, including plastics, metals, emitters, and dielectrics such as glass and water. They should be placed in their desired geometric correspondence to the local scene.

Once the distant scene, local scene, and synthetic objects are properly modeled and positioned, the global illumination software can be used in the normal fashion to produce renderings from the desired viewpoints.

Attention now turns to the operation of compositing with the use of the light probe. This section presents a particular technique for constructing a light-based model of a real scene suitable for adding synthetic objects at a particular location. This technique is useful for compositing objects into actual photography of a scene.

It was previously mentioned that the light-based model of the distant scene needs to appear correctly in the vicinity of the synthetic objects as well as from the desired viewpoints. This latter requirement can be satisfied if it is possible to directly acquire radiance maps of the scene from the desired viewpoints. The former requirement, that they appear photometrically correct in all directions in the vicinity of the synthetic objects, arises because this information comprises the incident light which will illuminate the objects.

Figure 2:
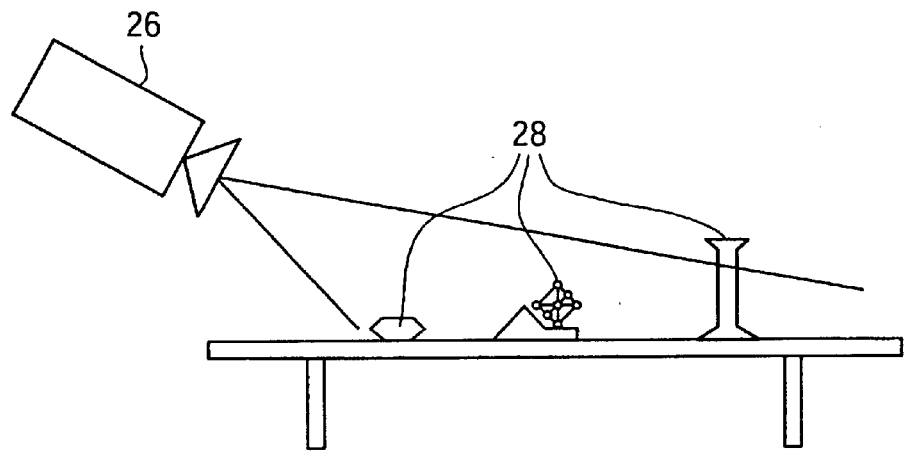
FIG. 2 illustrates the operation of acquiring a background photograph in accordance with an embodiment of the invention.
Figure 3:
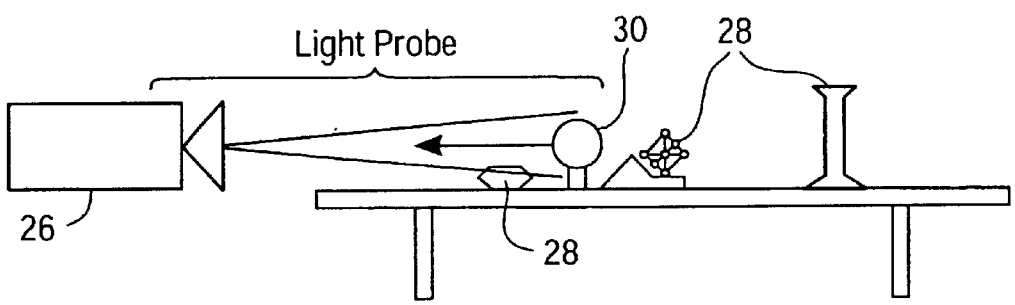
FIG. 3 illustrates the operation of using a light probe in accordance with an embodiment of the invention.

To obtain this part of the light-based model, one acquires a full dynamic range omnidirectional radiance map near the location of the synthetic object or objects. One technique of acquiring this radiance map is to photograph a spherical first-surface mirror, such as a polished steel ball, placed at or near the desired location of the synthetic object. FIG. 2 illustrates a set-up to acquire the background of a photograph. FIG. 2 includes a camera 26 and a set of objects 28. FIG. 3 illustrates a set-up for a light probe. In particular, the figure illustrates a camera 26, a set of objects 28, and a reflective ball 30.

Figure 4:
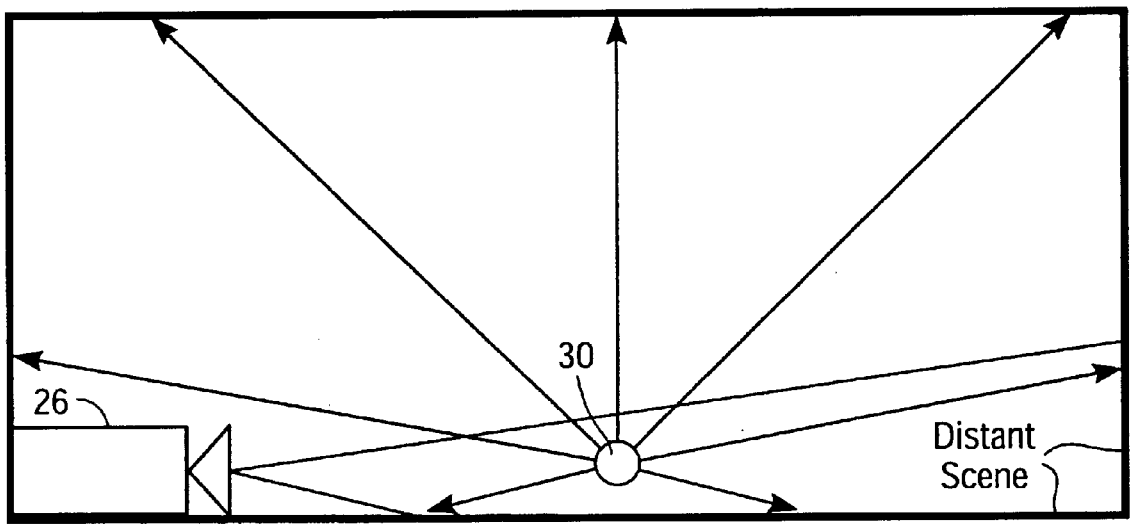
FIG. 4 illustrates the construction of a light based model in accordance with an embodiment of the invention.

The radiance measurements observed in the ball 30 are mapped onto the geometry of the distant scene. In many circumstances this model can be very simple. In particular, if the objects are small and resting on a flat surface, one can model the scene as a horizontal plane for the resting surface and a large dome for the rest of the environment. FIG. 4 illustrates the image from the ball 30 mapped onto a table surface and the walls and ceiling of a finite room The next step is to map from the probe to the scene model. To precisely determine the mapping between coordinates on the ball and rays in the world, one needs to record the position of the ball 30 relative to the camera 26, the size of the ball 30, and the camera parameters such as its location in the scene and focal length. With this information, it is straightforward to trace rays from the camera center through the pixels of the image, and reflect rays off the ball into the environment. Often a good approximation results from assuming the ball is small relative to the environment and that the camera's view is orthographic.

The data acquired from a single ball image will exhibit a number of artifacts. First, the camera 26 (and possibly the photographer) will be visible. The ball 30, in observing the scene, interacts with it, the ball (and its support) can appear in reflections, cast shadows, and can reflect light back onto surfaces. Lastly, the ball will not reflect the scene directly behind it, and will poorly sample the area nearby. If care is taken in positioning the ball and camera, these effects can be minimized and will have a negligible effect on the final renderings. If the artifacts are significant, the images can be fixed manually in image editing program or by selectively combining images of the ball taken from different directions. It has been observed that combining two images of the ball taken ninety degrees apart from each other allows one to eliminate the camera's appearance and to avoid poor sampling.

Figure 5:
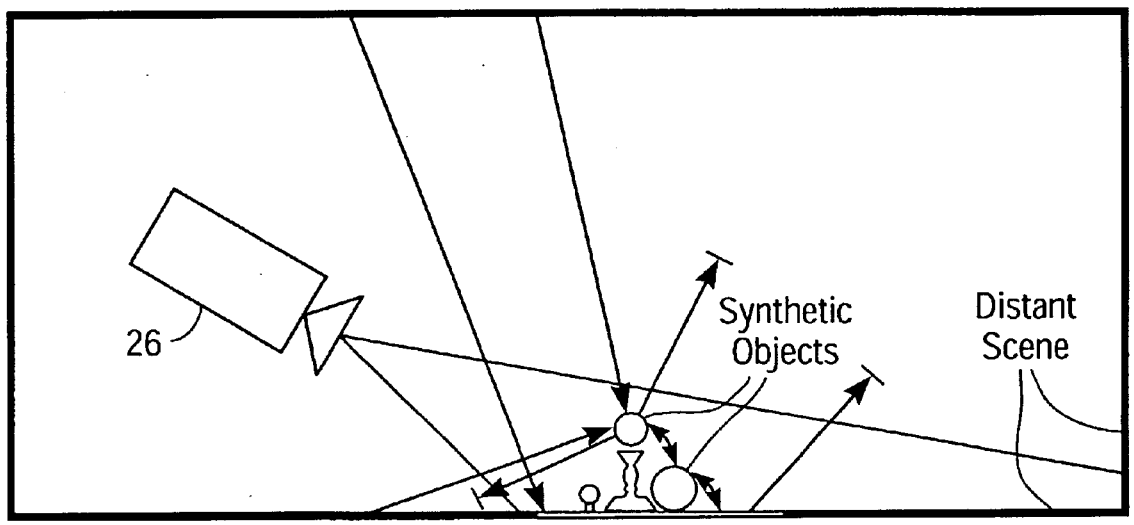
FIG. 5 illustrates the operation of computing a global illumination solution in accordance with an embodiment of the invention.

To render the objects into the scene, a synthetic local scene model is created. Images of the scene from the desired viewpoint(s) are taken, for example as shown in FIG. 2, and their position relative to the scene is recorded through pose-instrumented cameras or photogrammetry. The location of the ball in the scene is also recorded at this time. The global illumination software is then run to render the objects, local scene, and distant scene from the desired viewpoint, as shown in FIG. 5.

The objects and local scene are then composited onto the background image. To perform this compositing, a mask is created by rendering the objects and local scene in white and the distant scene in black. If objects in the distant scene (which may appear in front of the objects or local scene from certain viewpoints) are geometrically modeled, they will properly obscure the local scene and the objects as necessary. This compositing can be considered as a subset of the general method wherein the light-based model of the distant scene acts as follows: if $(V_z, V_y, V_x)$ corresponds to an actual view of the scene, return the radiance value looking in direction $(\theta, \phi)$. Otherwise, return the radiance value obtained by casting the ray $(\theta, \phi, V_z, V_y, V_x)$ onto the radiance-mapped distant scene model.

In the next section a more robust method of compositing the local scene into the background image is described. The method presented so far requires that the local scene be modeled accurately in both its geometry and its spatially varying material properties. If the model is inaccurate, the appearance of the local scene will not be consistent with the appearance of an adjacent distant scene.

Suppose that an illumination solution is computed for the local and distant scene models without including the synthetic objects. If the BRDF and geometry of the local scene model were perfectly accurate, then one would expect the appearance of the rendered local scene to be consistent with its appearance in the light-based model of the entire scene. Call the appearance of the local scene from the desired viewpoint in the light-based model $LS_b$, which is simply the background image. Let $LS_{noobl}$ denote the appearance of the local scene, without the synthetic objects, as calculated by the global illumination solution. The error in the rendered local scene (without the objects) is thus: $Err_{18}=LS_{noobl}-LS_b$. This error-results from the difference between the BRDF characteristics of the actual local scene as compared to the modeled local scene.

Let $LS_{obj}$ denote the appearance of the local environment as calculated by the global illumination solution with the synthetic objects in place. The error can be compensated if the final rendering $LS_{final}$ is computed as:

$$LS_{final}=LS_{obj}-Err_{18}$$

Equivalently, one can write:

$$LS_{final}=LS_b+(LS_{obj}-LS_{noobl})$$

In this form, it can be observed that whenever $LS_{obj}$ and $LS_{noobl}$ are the same (i.e. the addition of the objects to the scene had no effect on the local scene) the final rendering of the local scene is equivalent to $LS_b$ (e.g. the background plate). When $LS_{obj}$ is darker than $LS_{noobl}$ light is subtracted from the background to form shadows, and when $LS_{obj}$ is lighter than $LS_{noobl}$ light is added to the background to produce reflections and caustics.

Stated more generally, the appearance of the local scene without the objects is computed with the correct reflectance characteristics lit by the correct environment, and the change in appearance due to the presence of the synthetic objects is computed with the modeled reflectance characteristics as lit by the modeled environment. While the realism of $LS_{final}$ still benefits from having a good model of the reflectance characteristics of the local scene, the perceptual effect of small errors in albedo or specular properties is considerably reduced.

It is important to stress that this technique can still produce arbitrarily wrong results depending on the amount of error in the estimated local scene BRDF and the inaccuracies in the light-based model of the distance scene. In fact, $Err_{18}$ may be larger than $LS_{obj}$, causing $LS_{final}$ to be negative. An alternate approach is to compensate for the relative error in the appearance of the local scene: $LS_{final}=L_{sb}$ ($LS_{obj/LSnoobl}$). Inaccuracies in the local scene BRDF will also be reflected in the objects.

Techniques for estimating the BRDF of the local scene will now be described. Simulating the interaction of light between the local scene and the synthetic objects requires a model of the reflectance characteristics of the local scene. Recent work has presented methods for measuring the reflectance properties of materials through observation under controlled lighting configurations. Furthermore, reflectance characteristics can also be measured with commercial radiometric devices.

It would be more convenient if the local scene reflectance could be estimated directly from observation. Since the light-based model contains information about the radiance of the local scene as well as its irradiance, it actually contains information about the radiance of the local scene as well as its irradiance, it actually contains information about the local scene reflectance. If reflectance characteristics for the local scene are hypothesized, the local scene can be illuminated with its known irradiance from the light-based model. If the hypothesis is correct, then the appearance should be consistent with the measured appearance. This suggests the following iterative method for recovering the reflectance properties of the local scene:

1. Assume a reflectance model for the local scene (e.g. diffuse only, diffuse+specular, metallic or arbitrary BRDF, including spatial variation).
2. Choose approximate initial values for the parameters of the reflectance model.
3. Compute a global illumination solution for the local scene with the current parameters using the observed lighting configuration or configurations.
4. Compare the appearance of the rendered local scene to its actual appearance in one or more views.
5. If the renderings are not consistent, adjust the parameters of the reflectance model and return to step 3.

Assuming a diffuse-only model of the local scene in step 1 makes the adjustment in step 5 straightforward, one has:

$$L_{r1}(\theta_r, \phi_r)=\int_0^{2\pi}\int_0^{\pi/2}\rho_d L_i(\theta_i, \phi_i) \cos\theta_i \sin\theta_i \, d\theta_i \, d\phi_i = \rho_2 \int_0^{2\pi}\int_0^{\pi/2}(\theta_i,\phi_i)\cos\theta_i \sin\theta_i \, d\theta_i \, d\phi_i$$

If the local scene is initialized to be perfectly diffuse ($\rho_d=1$) everywhere, one has:

$$L_{r2}(\theta_r, \phi_r)=\int_0^{2\pi}\int_0^{\pi/2}L_i(\theta_i, \phi_i) \cos\theta_i \sin\theta_i \, d\theta_i \, d\phi_i$$

The updated diffuse reflectance coefficient for each part of the local scene can be computed as:

$$\rho' d = \frac{L_{r1}(\theta_r, \phi_r)}{L_{r2}(\theta_r, \phi_r)}$$

In this manner we use the global illumination calculation to render each patch as a perfectly diffuse reflector and compare the resulting radiance to the observed value. Dividing the two quantities yields the next estimate of the diffuse reflection coefficient $\rho^1_d$. Thus, diffuse reflectance characteristics of a scene are determined by dividing the measured amount of radiance leaving a surface within the scene by the cosine-weighted integral of the incident radiance at the surface.

If there is no inter-reflection within the local scene, then the $\rho_d$ estimates will make the renderings consistent. If there is inter-reflection, then the algorithm should be iterated until there is convergence. For a trichromatic image, the red, green, and blue diffuse reflectance values are computed independently. In the standard "plastic" illumination model, just two more coefficients—those for specular intensity and roughness—need to be specified.

In sum, a technique for adding new objects to light-based models with correct illumination has been described. The method leverages a technique of using high dynamic range images of real scene radiance to synthetically illuminate new objects with arbitrary reflectance characteristics. This technique is leveraged in a technique to simulate interplay of light between synthetic objects and the light-based environment, including shadows, reflections, and caustics. The method can be implemented with standard global illumination techniques.

For the particular case of rendering synthetic objects into real scenes (rather than general light-based models), a practical instance of the method that uses a light probe to record incident illumination in the vicinity of the synthetic objects is presented. In addition, a differential rendering technique is described that can convincingly render the interplay of light between objects and the local scene. An interactive approach was presented for determining reflectance characteristics of the local scene based on measured geometry and observed radiance in uncontrolled lighting conditions.

The technique of the invention allows synthetic objects to be realistically rendered into real scenes with correct lighting. A variant of the technique can be used to render real objects, such as real actors or actual product samples, into a real scene. For synthetic objects, the computer computes the appearance of the synthetic object under the measured illumination of the scene. For a real object, it is illuminated directly using an apparatus to project a field of light onto it using a computer-controlled bank of illumination. The object is then photographed, and when isolated from the photograph using a matte extraction technique, the object is composited into the scene as would a synthetic object in the technique described earlier. The computer-controlled bank of lighting takes on at least two forms. One is an array of lights of different colors positioned around and pointing toward the real object or actor. Another is an image projection device, such as a digital light projector aimed or focused at the person or object using a mirror. In either case, the light projection device is used to project onto the real person or object the appropriate illumination as recorded at the desired scene to be rendered into. Note finally that the image of the person or object under the desired illumination can be constructed by taking a linear combination of its appearance under a set of basis lighting configurations.

Figure 6:
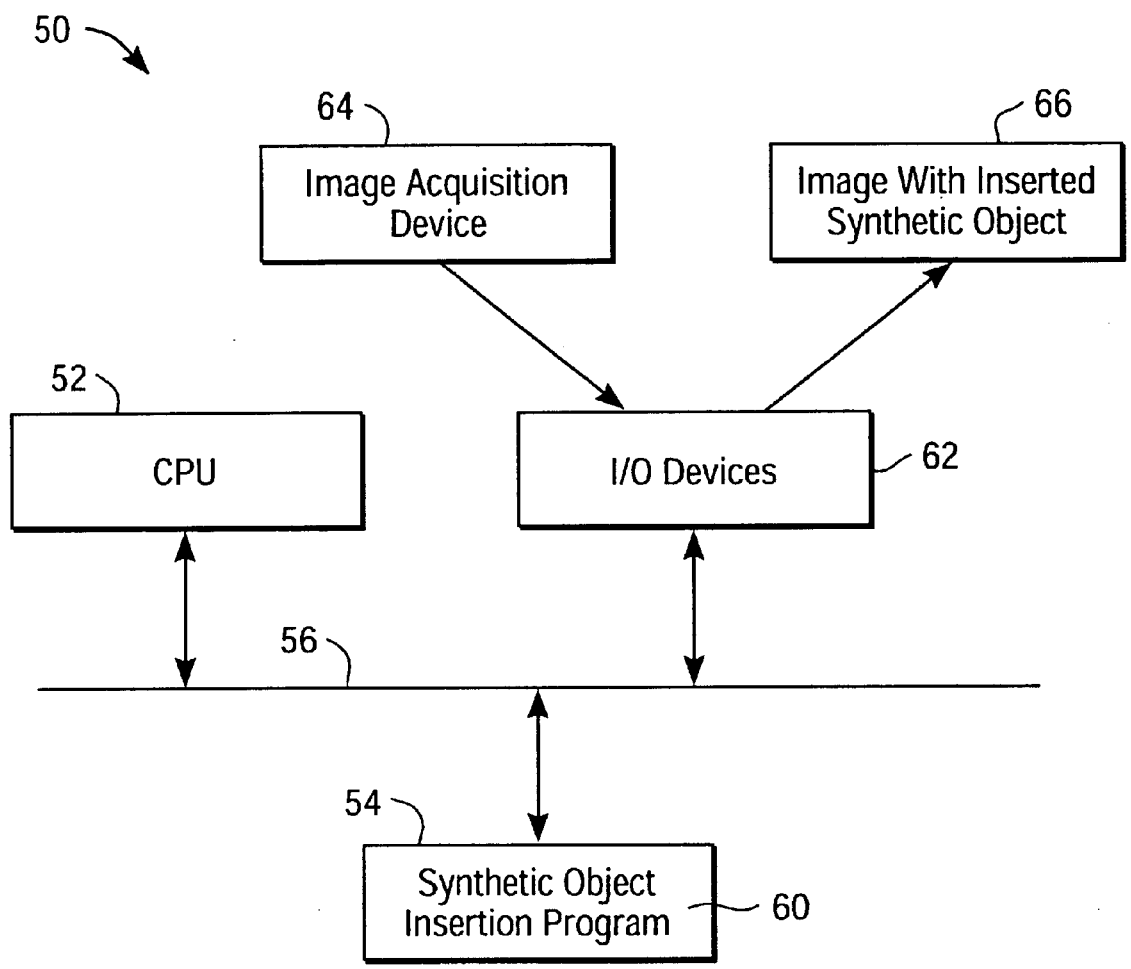
FIG. 6 illustrates an apparatus that may be used to implement the method of the invention.

FIG. 6 illustrates an apparatus 50 that may be used to implement the method of the invention. The apparatus 50 includes standard computer components of a central processing unit 52, a memory 54, and a system bus 56 for data communication between the central processing unit 52 and the memory 54. The memory 54 stores an executable program, namely a synthetic object insertion program 60 that has executable instructions to implement the techniques described herein. The synthetic object insertion program 60 operates on image data received through input/output devices 62 connected to an image acquisition device 64. The result of the processing of the synthetic object insertion program 60 is an image with an inserted synthetic object 66.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A method of placing an image of a synthetic object into a scene, said method comprising the steps of:

securing an omnidirectional image of a said scene to produce a high dynamic range illuminated scene;

specifying a desired position and orientation of a synthetic object within said high dynamic range illuminated scene;

partitioning said high dynamic range illuminated scene into a distant scene, a local scene, and said synthetic object;

computing a global illumination solution of said distant scene while assuming that it is photometrically unaffected by said local scene and said synthetic object; and computing a global illumination solution of said local scene that includes shadows and reflected light from said synthetic object.

2. A method of placing an image of a synthetic object into a scene, said method comprising the steps of:

securing an omnidirectional image of a said scene to produce a high dynamic range illuminated scene;

specifying a desired position and orientation of a synthetic object within said high dynamic range illuminated scene; and altering said high dynamic range illuminated scene based upon the presence of said synthetic object;

wherein said altering step includes:

partitioning said scene into a distant scene, a local scene, and said synthetic object;

rendering said distant scene while assuming that it is photometrically unaffected by said local scene and said synthetic object; and computing a high dynamic range global illumination solution of said local scene that includes shadows and reflected light from said synthetic object.

3. The method of claim 2, wherein the step of computing a global illumination solution includes computing a global illumination solution for said synthetic object.

4. The method of claim 2, wherein the step of securing an omnidirectional image includes securing a high dynamic omnidirectional radiance map within said scene.

5. The method of claim 4, wherein the step of rending said distant scene includes mapping radiance values from the high dynamic range omnidirectional radiance map onto said distant scene, and computing a global illumination solution for the distant scene, where the global illumination solution for the distance scene is unaffected by said local scene and said synthetic object.

6. The method of claim 2, wherein the step of rending said distant scene includes computing a global illumination solution for the distant scene, where the global illumination solution for the distance scene is unaffected by said local scene and said synthetic object.

7. Apparatus for placing an image of a synthetic object into a scene, comprising:

means for securing an omnidirectional image of a scene to produce a high dynamic range illuminated said scene;

means for specifying a desired position and orientation of a synthetic object within said high dynamic range illuminated scene;

means for partitioning said high dynamic range illuminated scene into a distant scene, a local scene, and said synthetic object;

means for computing a global illumination solution of said distant scene while assuming that it is photometrically unaffected by said local scene and said synthetic object; and means for computing a global illumination solution of said local scene that includes shadows and reflected light from said synthetic object.

\* \* \* \* \*